(12) United States Patent
Schildmeyer et al.

(10) Patent No.: US 7,110,657 B1
(45) Date of Patent: Sep. 19, 2006

(54) METHOD OF MEASURING CIRCULARITY OF AN OPTICAL FIBER

(75) Inventors: Frederic Campbell Schildmeyer, Lake Oswego, OR (US); Casey S. Shaar, Portland, OR (US)

(73) Assignee: Photon Kinetics, Inc., Beaverton, OR (US)

(*) Notice: Subject to any disclaimer, the term of this patent is extended or adjusted under 35 U.S.C. 154(b) by 0 days.

(21) Appl. No.: 11/066,847

(22) Filed: Feb. 23, 2005

Related U.S. Application Data

(60) Provisional application No. 60/547,238, filed on Feb. 23, 2004.

(51) Int. Cl.
*G02B 6/00* (2006.01)
(52) U.S. Cl. ................... 385/147; 356/73.1
(58) Field of Classification Search ............ None
See application file for complete search history.

(56) References Cited

U.S. PATENT DOCUMENTS

| 4,441,026 | A | * | 4/1984 | Moriwaki et al. ..... 250/559.35 |
| 4,563,087 | A | * | 1/1986 | Bourbin et al. ............ 356/73.1 |
| 5,367,372 | A | * | 11/1994 | DiVita et al. .............. 356/73.1 |
| 6,421,118 | B1 | | 7/2002 | Shaar |

* cited by examiner

*Primary Examiner*—Sung Pak
(74) *Attorney, Agent, or Firm*—John Smith-Hill; Smith-Hill and Bedell

(57) ABSTRACT

Distortion introduced by an imaging system is characterized by positioning a generally cylindrical object and imaging optics in a first relative angular position about an axis of rotation that substantially coincides with the longitudinal axis of the object and employing the imaging optics to image the end face of the object on a detector. First and second definitions of the shape of the image of the periphery of the end face of the object are extracted from image data provided by the detector when the object and the imaging optics are in first and second relative angular positions. The first and second definitions are compared.

9 Claims, 4 Drawing Sheets

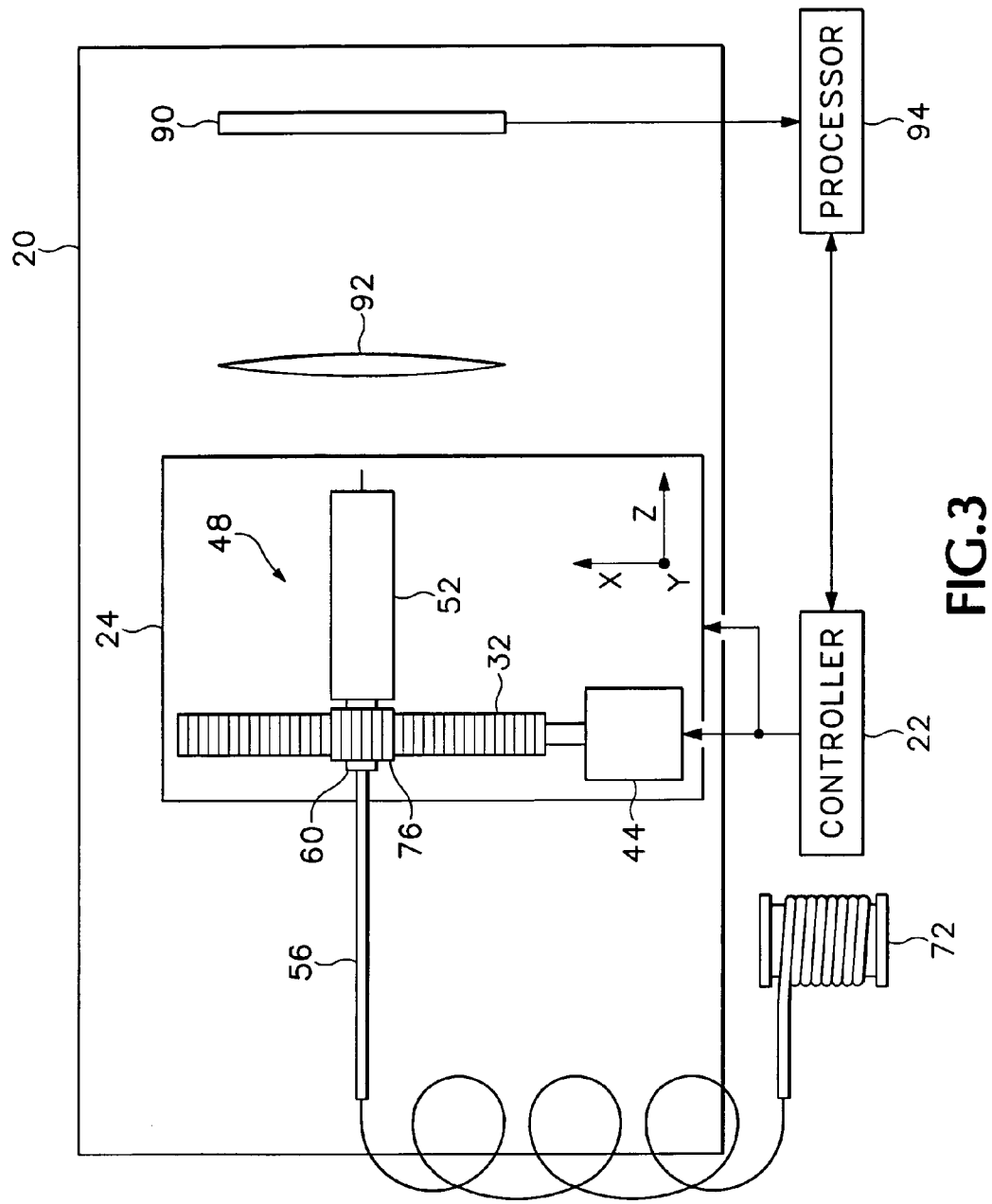

METHOD OF MEASURING CIRCULARITY OF AN OPTICAL FIBER

CROSS-REFERENCE TO RELATED APPLICATION

This application claims benefit of U.S. Provisional Application No. 60/547,238 filed Feb. 23, 2004.

BACKGROUND OF THE INVENTION

This invention relates to a method of measuring circularity of an optical fiber.

Referring to FIG. 1, an optical fiber is composed of a core 12 of high refractive index material surrounded by a cladding 14 of low refractive index material. Ideally, the core and the cladding are substantially circular in cross-section and the core is centered within the cladding, as shown in FIG. 1. However, current techniques for manufacture of optical fibers do not ensure that the cladding is circular when viewed in cross-section and it may in fact be more or less elliptical, as shown in FIG. 2. An important measure of the quality of an optical fiber is the non-circularity of the cladding, which is defined as $$NC\% = \frac{A-B}{(B+A)/2} \times 100$$

where A is the maximum diameter of the cladding measured using a contact micrometer or similar technique and B is the diameter measured along an axis that is perpendicular to the diameter along which the maximum diameter is measured. It will be understood that in the case of an elliptical cladding, the ellipticity of the cladding may be defined as B/A. The value (B+A)/2 may be specified as the diameter of the cladding.

It is known to measure geometrical characteristics of an optical fiber by cleaving the fiber and carrying out measurements on the end face of the optical fiber employing imaging optics to project an image of the end face on a CCD sensor, which generates an electrical signal representative of intensity of illumination of the sensor as a function of position in the image plane by reference to a Cartesian coordinate system. This electrical signal can be digitized and the resulting data stored as an electronic representation of the optical image that is projected into the image plane by the imaging optics. A video signal for driving a monitor to display a visually perceptible image of the end face of the fiber can be generated by reading out and appropriately processing the electronic image data. See U.S. Pat. No. 6,421,118.

Using conventional image processing software, it is possible to analyze the electronic image data generated by the imaging optics and the CCD sensor and identify points that lie on the periphery of the electronic representation of the cladding, calculate the locations of these points in the electronic representation, and calculate the equation of an ellipse 16 (FIG. 2) that optimally fits the locations of the points. It is then possible to calculate the values of the non-circularity and diameter of the cladding.

If the imaging system (imaging optics and CCD sensor) were perfect, the calculated values of the fiber parameters would be equal to the actual values of the parameters. However, imperfections in the imaging optics may introduce errors such that the image of the cladding is distorted. The distortion may result in the image of a circular cladding being elliptical. Further, imperfections in the CCD sensor may introduce errors in measuring the location of a feature in the image plane. Consequently, unless one is able to sufficiently calibrate the imaging system, it is not possible to know a geometric parameter of the cladding simply by acquiring and analyzing an electronic image of the end face of the fiber.

SUMMARY OF THE INVENTION

It will be understood that if the CCD sensor does not introduce distortion into the electronic image, for example due to non-uniformity in spacing of rows and columns of pixels, the elliptical nature of the electronic image is due to the cladding itself being elliptical and/or to distortion introduced by the imaging optics.

It has now been recognized that elliptical distortion of an image of a cladding by imaging optics can be separated from elliptical distortion due to non-circularity of the cladding itself.

In accordance with a first aspect of the present invention there is provided a method of characterizing distortion introduced by an imaging system that comprises imaging optics and a detector, the method comprising providing a generally cylindrical object having a peripheral surface, an end face and a longitudinal axis, positioning the object with the longitudinal axis substantially coinciding with an axis of rotation, the object and the imaging optics being in a first relative angular position about the axis of rotation, employing the imaging optics to image the end face of the object on the detector, extracting a first definition of the shape of the image of the periphery of the end face of the object from image data provided by the detector when the object and the imaging optics are in the first relative angular position, effecting relative rotation of the imaging optics and the object about the axis of rotation to a second relative angular position, extracting a second definition of the shape of the image of the periphery of the end face of the object from image data provided by the detector when the object and the imaging optics are in the second relative angular position, and comparing the first and second definitions.

In accordance with a second aspect of the present invention there is provided a method of characterizing a feature of an optical fiber segment composed of a core and a cladding, the fiber segment having an end face and a longitudinal axis and the cladding having a peripheral surface, the method comprising positioning the fiber segment with the longitudinal axis of the fiber segment substantially coinciding with an axis of rotation, the fiber segment being in a first angular position about the axis of rotation, imaging the end face of the fiber segment on a detector, extracting a first definition of the shape of the peripheral surface of the cladding at the end face of the fiber segment from image data provided by the detector when the fiber segment is in the first angular position, effecting relative rotation of the fiber segment and the detector about the axis of rotation to a second angular position, extracting a second definition of the shape of the peripheral surface of the cladding at the end face of the fiber segment from image data provided by the detector when the end face of the fiber segment is in the second angular position, and comparing the first and second definitions.

In accordance with a third aspect of the present invention there is provided apparatus for characterizing a feature of an optical fiber segment composed of a core and a cladding, the fiber segment having an end face and a longitudinal axis and the cladding having a peripheral surface, the apparatus comprising a holder for positioning the fiber segment with the longitudinal axis of the fiber segment substantially coinciding with an axis of rotation, a detector, a lens for imaging the end face of the fiber segment held by the holder on the detector, a mechanism for effecting relative rotation of the fiber segment and the detector about the axis of rotation to at least first and second distinct angular positions, a processor for acquiring image data provided by the detector when the fiber segment is in the first and second angular positions relative to the detector, the processor being programmed to extract a first definition of the shape of the peripheral surface of the cladding at the end face of the fiber segment from the image data provided by the detector when the fiber segment is in the first angular position, extract a second definition of the shape of the peripheral surface of the cladding at the end face of the fiber segment from the image data provided by the detector when the end face of the fiber segment is in the second angular position, and compare the first and second definitions.

BRIEF DESCRIPTION OF THE DRAWINGS

For a better understanding of the invention, and to show how the same may be carried into effect, reference will now be made, by way of example, to the accompanying drawings, in which FIG. 1 is an end view of an ideal optical fiber, FIG. 2 is an end view of an optical fiber in which the cladding has an elliptical, rather than circular, periphery, FIG. 3 is a plan view of apparatus for carrying out a method embodying the present invention.

DETAILED DESCRIPTION

Figure 6:
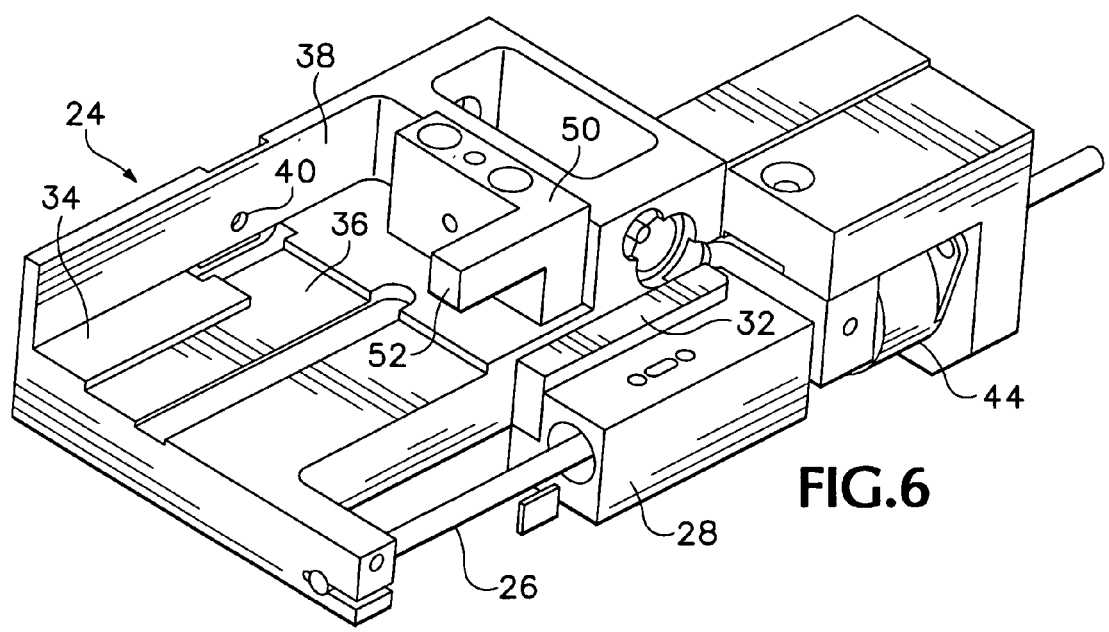
FIG. 6 is a perspective view of a docking station that is included in a practical implementation of the apparatus shown in FIG. 3.
Figure 7:
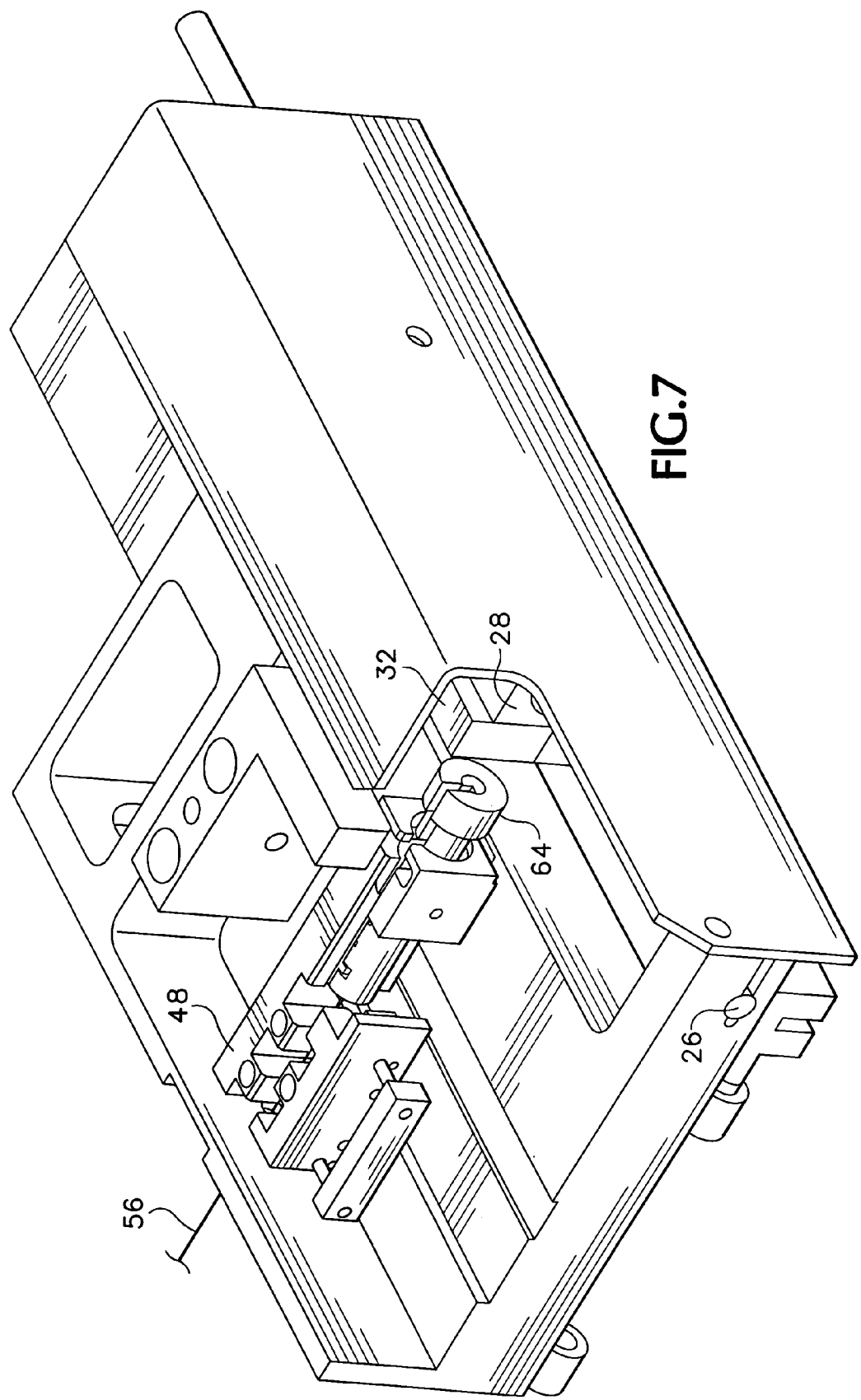
FIG. 7 is a perspective view of the docking station with the fiber clip located therein.

The apparatus shown in FIG. 3 includes a frame 20 on which an XYZ stage 24 is mounted in a manner that allows linear movement of the stage 24 relative to the frame 20 along three mutually perpendicular axes X, Y and Z. Motors (not shown) drive the stage 24 along the X-, Y- and Z-axes under control of signals provided by a controller 22. The X- and Z-axes are horizontal and the Y-axis is vertical. Referring also to FIGS. 6 and 7, the stage 24 supports a shaft 26 that is aligned with the X-axis and on which a carriage 28 is mounted for sliding linear movement along the X-axis. A linear motor 44 is also mounted on the stage 24 and is connected to the carriage 28 for driving the carriage along the X-axis under control of signals provided by the controller 22. A rack gear 32 is attached to the carriage.

Referring to FIGS. 6 and 7, the XYZ stage has a horizontal bottom plate 34 formed with a rectangular channel 36 that serves as a docking station for a fiber clip 48 providing both fiber clamping and rotational guiding. The stage 24 has a vertical wall 38 formed with a hole 40. A retainer block 50 having a projecting arm 52 is mounted to the stage 24 by guide pins (not shown) that allow vertical movement of the block relative to the stage. Compression springs urge the retainer block 52 downward relative to the stage.

Referring to FIG. 3, the apparatus also includes a CCD sensor 90 and a lens 92 which are mounted stationarily on the frame 20. The CCD sensor and the lens together form a digital video microscope. As explained in greater detail below, the stage is positioned so that the hole 40 in the wall 38 is aligned with the lens 92.

Let us assume that the rack is at an intermediate position along the path of travel from an initial position (the beginning of its path of travel away from the motor 44 along the shaft 26) to a final position (the end of its path of travel away from the motor 44). At the intermediate position of the rack, a force transmission mechanism (not shown) couples the rack to the retainer block and the retainer block is at a lower position relative to the stage. Let us further assume that the fiber clip is in the docking station. The arm 52 engages the fiber clip and holds the fiber clip securely in the docking station by virtue of the spring force that urges the retainer block downward. The controller operates the motor 44 in a manner to drive the rack towards the initial position. Because the retainer block is coupled to the rack, movement of the rack towards the initial position is accompanied by upward movement of the retainer block, against the force of the compression springs, and the fiber clip is released from the docking station. When the rack reaches the initial position, the retainer block is at an upper position and the fiber clip can be easily removed from the docking station.

Figure 4:
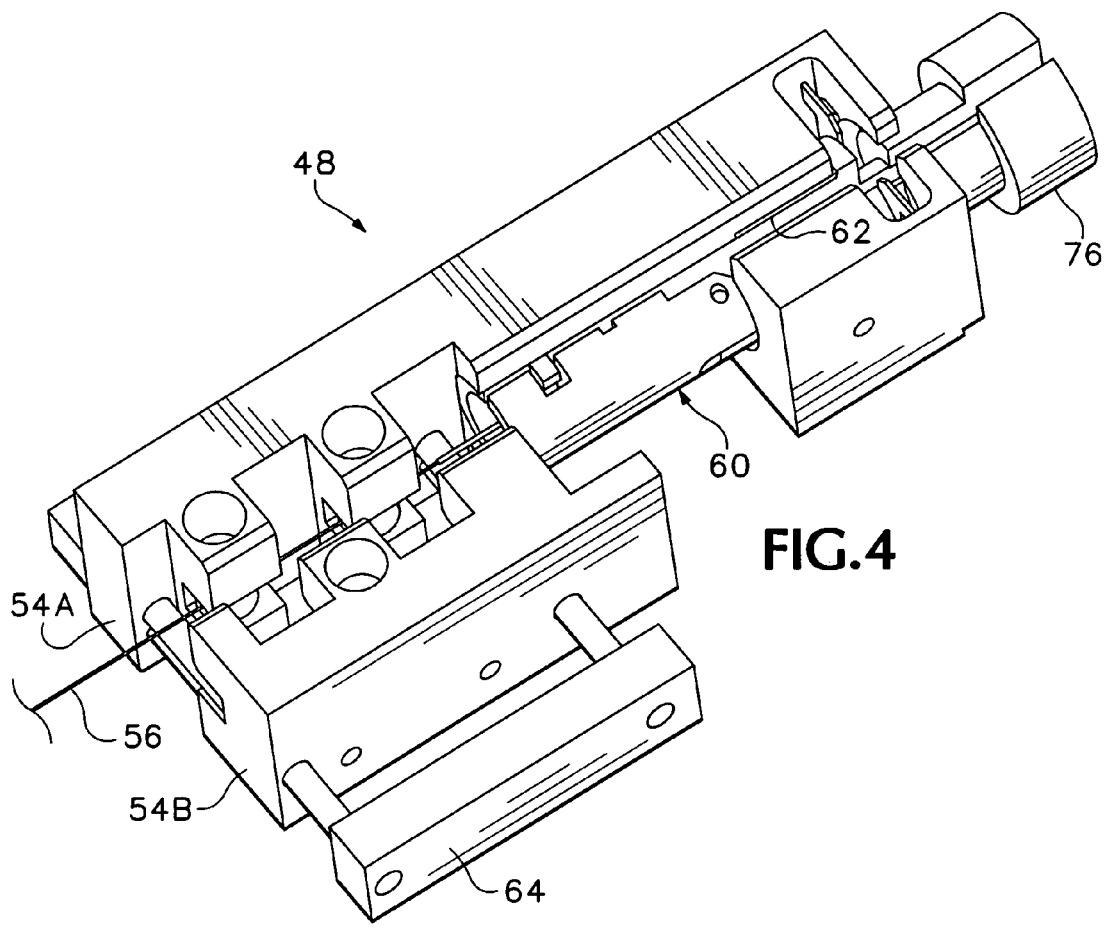
FIG. 4 is a perspective view of a fiber clip that is used in a practical implementation of the apparatus shown in FIG. 3.
Figure 5:
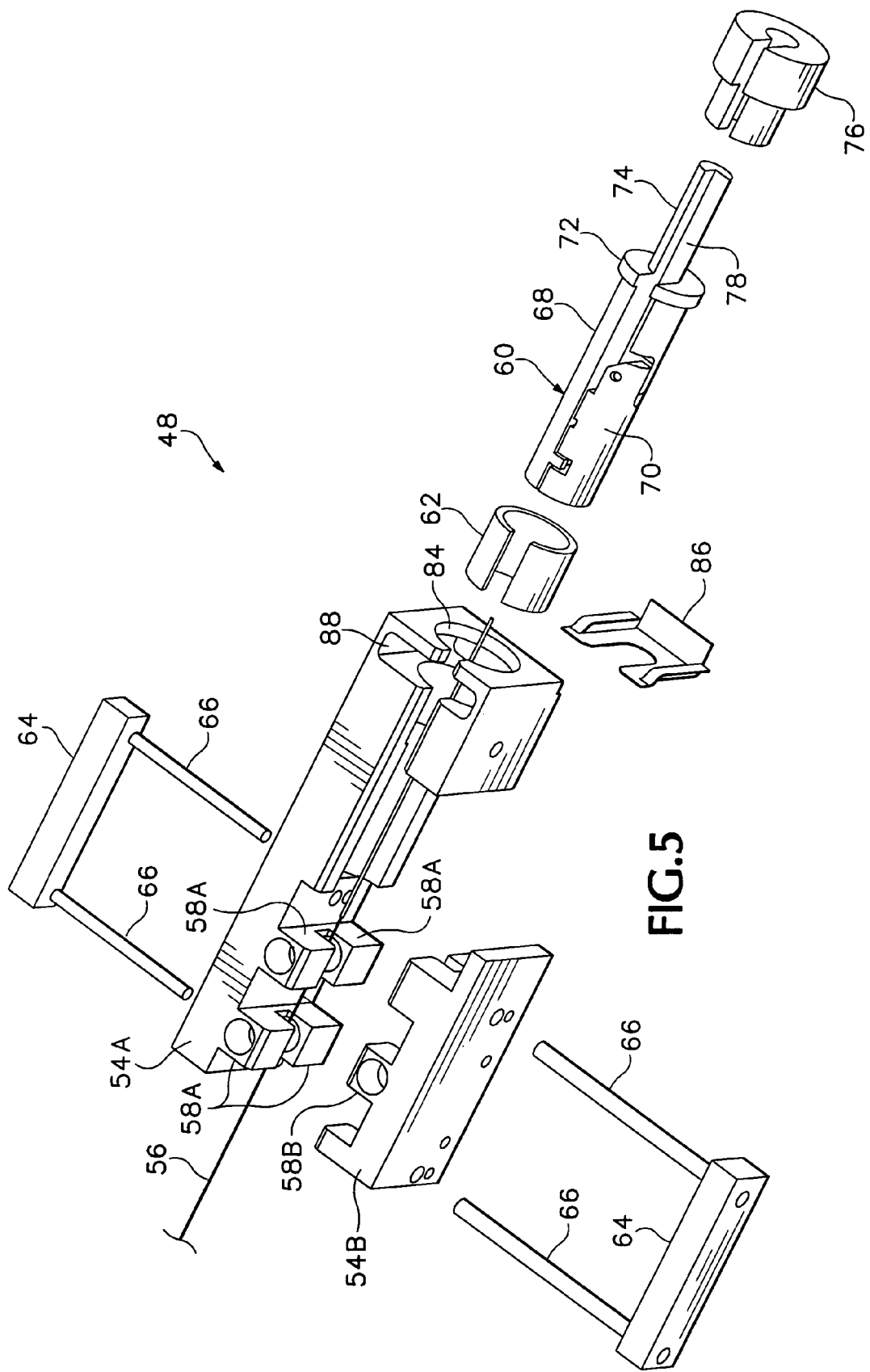
FIG. 5 is an exploded view of the fiber clip shown in FIG. 4.

Referring to FIGS. 4 and 5, the fiber clip 48 includes first and second jaws 54A, 54B and a fiber holder 60. The jaw 54A includes two pairs of ruby balls (not shown) held in structures 58A that are spaced apart along the longitudinal axis of the fiber holder and the jaw 54B includes a pair of ruby balls held in a structure 58B located lengthwise between the two structures 58A. Each jaw is attached to a corresponding plunger bar 64 by two plunger rods 66 that pass slidingly through the other jaw. Compression springs (not shown) threaded by the plunger rods urge the jaws together. Squeezing the plunger bars 64 together forces the jaws 54 apart.

The fiber holder 60 is generally cylindrical and defines a longitudinal axis. The fiber holder is journalled in the jaw 54A by a sleeve 62 that is glued into the jaw 54A and serves as a composite bearing for the holder so that the fiber holder 60 is rotatable relative to the jaw 54A. The holder 60 includes a body 68 and a clamp 70 that is pivotally mounted for rotation relative to the holder body 70 about an axis that is perpendicular to, and offset from, the longitudinal axis of the holder 60 between a closed position (FIG. 5) and an open position, in which the clamp is oriented at about 90° to the holder body. The holder body has an external flange 72 at one end and a stem 74 projects from the flange coaxially with the holder body. A spur gear 76 is mounted on the stem and is secured to the stem, e.g. by glue and a set screw. The holder body and stem define a channel 78 for receiving an optical fiber.

In operation of the apparatus, the operator inserts the fiber holder 60 into the fiber clip 48 through the circular opening 84 in the jaw 54A so that the holder body is positioned inside the sleeve 62, and the operator installs a removable spring clip 86 in a pocket 88 in the jaw 54A. The spring clip 86 bears against the forward surface of the flange 72 and holds the fiber holder in the jaw 54A. The fiber holder is free to rotate relative to the jaw 54A. The operator turns the fiber holder about its central axis to the orientation shown in FIG. 4, in which the slot in the gear is aligned with the slot in the jaw 54A. The operator strips the protective jacket from the end portion 56 of a fiber segment, opens the fiber clamp 70 and squeezes the plunger bars 64 together to open the jaws 54 and places the segment of fiber in the clip so that it lies in the fiber channel 78 of the fiber holder 60. The operator then releases the plunger bars and the jaws close onto the stripped portion 56 of the fiber segment. When the jaws are closed, the three pairs of ruby balls define a narrow cylindrical passage whose periphery is tangential to all six ruby balls and is of a size that allows the stripped portion 56 of the fiber segment to rotate while restraining the fiber segment against transverse movement.

The operator closes the clamp 70 (which engages the unstripped portion of the fiber) and the fiber is then held against longitudinal movement relative to the fiber clip. The operator may then install the clip in a cleaver, which cleaves the stripped portion of the fiber at a predetermined distance from the jaws and creates a fresh, clean end face.

Assuming that the rack is at the initial position (and the retainer block is at its upper position relative to the stage 24), the operator places the fiber clip in the stage with the jaws 54 located in the channel 36 in the bottom plate 34 and in contact with the wall 38 of the stage and the gear in meshing engagement with the rack. The cleaved end face of the fiber segment is then aligned with the hole 40 in the wall 38 and is presented towards the lens 92. The operator initiates the test and the motor 44 drives the rack from the initial position towards the final position. During the first or preparatory phase of movement of the rack, movement of the rack allows the retainer block to move downward under the influence of the compression springs. Ultimately, when the rack reaches the intermediate position in its travel, the retainer block reaches its lower position, the retainer arm engages the jaw 54A and the force supplied by the compression springs holds the clip in position in the docking station. In this position, the stripped portion 56 of the fiber segment is oriented along the Z-axis, which coincides with the axis of rotation defined by the guiding element of the fiber clip, and the cleaved end face is presented towards the video microscope.

During the second or measurement phase of movement of the rack, the motor drives the rack stepwise from the intermediate position towards the final position and back to the intermediate position. Upon moving from the intermediate position, the force transmission mechanism disengages the retainer block from the rack. The stepwise movement of the rack results in the clip 60 rotating stepwise about an axis of rotation defined by the sleeve 62. The maximum angle of rotation of the clip 60 during a test is limited so that stress in the fiber can be kept within acceptable limits without its being necessary to rotate the fiber spool 72 with the clamp. During the measurement phase, characteristics of the stripped portion of the fiber segment are measured, as described below, at various angular positions of the stripped portion. When the rack returns to the intermediate position, the force transmission mechanism again couples the retainer block to the rack and further movement of the rack towards the initial position results in the retainer block being forced upwards and releasing the fiber clip so that another fiber can be installed in the clip and prepared for testing.

The cleaved end face of the stripped portion 56 is presented towards the lens 92 and the core and the cladding at that end face are illuminated so that they can be viewed through the microscope. By operating the XYZ stage 24, the fiber clip 48 is brought to a position in which the end face of the fiber segment is imaged by the lens on the sensor 90 and the image of the end face is at a desired position relative to the active area of the sensor. The sensor 90 generates an electrical signal representative of the intensity of illumination of the sensor as a function of position over the active area of the sensor with reference to a two-dimensional Cartesian coordinate system. The electrical signal is digitized and the resulting digital signal is supplied to a processor 94. The processor employs image processing software, operating using known principles, to analyze the electronic image generated by the CCD sensor and detect edges and identify an edge that represents the image of the periphery of the cladding and an edge that represents the image of the periphery of the core. The processor calculates the locations (relative to the Cartesian coordinate system) of points on these edges.

Let us assume that at a first angular position of the clip 60, the electronic image of the edge that represents the periphery of the cladding is an ellipse having major and minor radii A and B, with the radius A oriented vertically in the image (parallel to the Y-axis). There are two possible reasons why the image should not be of a circle: the periphery of the cladding might be distorted from circular and the imaging system might introduce distortion. We will call these two distortions physical distortion and measurement distortion. Let us further assume that if we rotate the clamp through 90° and acquire a second image of the end face of the fiber segment, the image is identical to the first image. We can then infer to first order that the periphery of the cladding is circular and that all the distortion occurs due to the imaging system: there is no physical distortion but there is measurement distortion. We can then characterize the imaging system and use this characterization to correct the electronic image of the periphery of the cladding of another optical fiber. If, conversely, when we rotate the clamp through 90° and acquire a second image of the end face of the fiber segment, the image of the edge that represents the periphery of the cladding is an ellipse having a major radius A and a minor radius B and the minor axis is oriented vertically in the image, we can infer to first order that there is physical distortion and no measurement distortion: the periphery of the cladding is elliptical and the major and minor radii values of the periphery of the cladding, scaled to take account of the magnification M of the imaging system, are equal to A and B respectively. For the general case, in which the edge that represents the periphery of the cladding at the end face of the fiber segment is an ellipse of unknown dimensions and the imaging system introduces an elongation of unknown aspect ratio along an axis at an unknown orientation, it can be shown that the measurement distortion and the physical distortion can be separated by acquiring multiple images at different angular orientations of the fiber relative to the imaging system.

In an embodiment of the invention, measurements are made at, for example, six different angular positions of the clamp and at each position a data set defining points on the periphery of the cladding is acquired. For each data set, the processor calculates the ellipse fit for the data set. The six ellipse fits that are calculated for the six different angular positions of the clamp are then taken as an ensemble consisting as two mathematical entities: an ellipse of unknown dimensions rotating in the imaging system, and an unknown distortion of the imaging system which does not rotate. Using geometrical mathematics, these two entities can be independently characterized. By measuring the fiber at different orientations, the effects of spatial dependent magnification are averaged and by measuring each region of the periphery of the cladding in different optical fields, orientation biasing is minimized. In addition, the different data sets are transformed to a common center or origin. The spatial averaging reduces errors introduced by cleave angle, fiber clip alignment, optical surface tilt, non-linear CCD response and other system aberrations that produce spatial field dependent magnification.

At each orientation of the fiber, the CCD sensor also acquires an image of the edge that represents the periphery of the core of the fiber and the processor applies an ellipse fit to the data points that define the periphery of the core and calculates the center of the core. Six values of the location of the center of the core are calculated, for the six orientations respectively of the fiber end segment (after the periphery of the cladding has been brought to a common center but before the data sets are transformed to a common orientation) and the processor applies a circle to the six points. As discussed in U.S. Pat. No. 6,421,118, the radius of this circle is equal to the concentricity of the fiber relative to the axis of rotation of the clamp and the line segment from the axis of rotation of the clamp to the center of the circle corresponds to the error vector, the size of which represents the quality of the optical alignment.

It will be appreciated that the invention is not restricted to the particular embodiment that has been described, and that variations may be made therein without departing from the scope of the invention as defined in the appended claims and equivalents thereof. For example, although the invention has been described with reference to a simple elliptical distortion and a simple linear elongation, it can be shown that to first order an arbitrary physical distortion and an arbitrary measurement distortion can be separated. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

The invention claimed is:

1. A method of characterizing distortion introduced by an imaging system that comprises imaging optics and a detector, the method comprising:

providing a generally cylindrical object having a peripheral surface, an end face and a longitudinal axis, positioning the object with the longitudinal axis substantially coinciding with an axis of rotation, the object and the imaging optics being in a first relative angular position about the axis of rotation, employing the imaging optics to image the end face of the object on the detector, extracting a first definition of the shape of the image of the periphery of the end face of the object from image data provided by the detector when the object and the imaging optics are in the first relative angular position, effecting relative rotation of the imaging optics and the object about the axis of rotation to a second relative angular position, extracting a second definition of the shape of the image of the periphery of the end face of the object from image data provided by the detector when the object and the imaging optics are in the second relative angular position, calculating a function that characterizes measurement distortion introduced by the imaging system, and applying said function to at least one of the first and second definitions to determine physical distortion of the peripheral surface of the cylindrical object.

2. A method according to claim 1, comprising effecting relative rotation of the object and the imaging system about the axis of rotation to at least third and fourth angular positions, extracting third and fourth definitions of the shape of the image of the periphery of the end face of the object from image data provided by the detector when the object is in the third and fourth angular positions respectively, and mathematically effecting a relative transform of the first, second, third and fourth definitions to a common center and angular position.

3. A method according to claim 2, wherein the step of calculating the function that characterizes measurement distortion introduced by the imaging system utilizes an ensemble of definitions of the shape of the image of the periphery of the end face of the object.

4. A method of characterizing a feature of an optical fiber segment composed of a core and a cladding, the fiber segment having an end face and a longitudinal axis and the cladding having a peripheral surface, the method comprising:

positioning the fiber segment with the longitudinal axis of the fiber segment substantially coinciding with an axis of rotation, the fiber segment being in a first angular position about the axis of rotation, imaging the end face of the fiber segment on a detector, extracting a first definition of the shape of the peripheral surface of the cladding at the end face of the fiber segment from image data provided by the detector when the fiber segment is in the first angular position, effecting relative rotation of the fiber segment and the detector about the axis of rotation to a second angular position, extracting a second definition of the shape of the peripheral surface of the cladding at the end face of the fiber segment from image data provided by the detector when the end face of the fiber segment is in the second angular position, calculating a function that characterizes measurement distortion of the first and second definitions, and applying said function to at least one of the first and second definitions to determine physical distortion of the peripheral surface of the cladding.

5. A method according to claim 4, comprising effecting relative rotation of the fiber segment and the detector about the axis of rotation to at least third and fourth angular positions, extracting third and fourth definitions of the shape of the peripheral surface of the cladding at the end face of the fiber segment from image data provided by the detector when the end face of the segment is in the third and fourth angular positions respectively, and mathematically effecting a relative transform of the first, second, third and fourth definitions to a common center.

6. A method according to claim 4, wherein the image of the end face of the fiber segment includes an edge between the core and the cladding and the method comprises:

extracting a first definition of the shape of the edge from image data provided by the detector when the fiber segment is in the first angular position, extracting a second definition of the shape of the edge from the image data provided by the detector when the end face of the fiber segment is in the second angular position, and comparing the first and second definitions of the shape of the edge.

7. A method according to claim 6, further comprising effecting relative rotation of the fiber segment and the detector about the axis of rotation to at least third and fourth angular positions, extracting third and fourth definitions of the shape of the edge from image data provided by the detector when the end face of the segment is in the third and fourth angular positions respectively, and mathematically effecting a relative transform of the first, second, third and fourth definitions of the shape of the edge to the common center.

8. A method according to claim 7, comprising adjusting each of the first, second, third and fourth definitions of the shape of the edge to define an ellipse, each ellipse having a center, defining the locus of the centers of the ellipses, and defining a circle that optimally fits the locus of the centers of the ellipses.

9. Apparatus for characterizing a feature of an optical fiber segment composed of a core and a cladding, the fiber segment having an end face and a longitudinal axis and the cladding having a peripheral surface, the apparatus comprising:
- a holder for positioning the fiber segment with the longitudinal axis of the fiber segment substantially coinciding with an axis of rotation,
- a detector,
- a lens for imaging the end face of the fiber segment held by the holder on the detector,
- a mechanism for effecting relative rotation of the fiber segment and the detector about the axis of rotation to at least first and second distinct angular positions,
- a processor for acquiring image data provided by the detector when the fiber segment is in the first and second angular positions relative to the detector, the processor being programmed to
- extract a first definition of the shape of the peripheral surface of the cladding at the end face of the fiber segment from the image data provided by the detector when the fiber segment is in the first angular position,
- extract a second definition of the shape of the peripheral surface of the cladding at the end face of the fiber segment from the image data provided by the detector when the end face of the fiber segment is in the second angular position,
- calculate a function that characterizes measurement distortion of the first and second definitions, and
- apply said function to at least one of the first and second definitions to determine physical distortion of the peripheral surface of the cladding.

* * * * *